United States Patent [19]
Nakano et al.

[11] Patent Number: 5,566,142
[45] Date of Patent: Oct. 15, 1996

[54] APPARATUS USING AN OPTICAL PICKUP

[75] Inventors: Junichi Nakano, Hino; Nobuo Miyairi, Fujinomachi; Shohei Kobayashi, Hachioji; Akihiko Yoshizawa, Tsukuimachi, all of Japan

[73] Assignee: Olympus Optical Co., Ltd., Tokyo, Japan

[21] Appl. No.: 384,843

[22] Filed: Feb. 7, 1995

[30]  Foreign Application Priority Data

Feb. 10, 1994 [JP] Japan .................................... 6-016658
Apr. 21, 1994 [JP] Japan .................................... 6-083206

[51] Int. Cl.$^6$ ..................................................... G11B 7/00
[52] U.S. Cl. ...................... 369/122; 369/121; 369/103; 369/109; 369/44.12
[58] Field of Search ................................. 369/122, 121, 369/124, 103, 109, 112, 116, 44.12

[56]  References Cited

U.S. PATENT DOCUMENTS

| | | | |
|---|---|---|---|
| 4,716,559 | 12/1987 | Hine | 369/121 |
| 4,783,776 | 11/1988 | Ishigaki et al. | 369/109 |
| 4,811,329 | 3/1989 | Shikama et al. | 369/116 |
| 4,861,128 | 8/1989 | Ishikawa et al. | 369/122 |
| 4,893,296 | 1/1990 | Matsumoto et al. | 369/122 |
| 5,327,415 | 7/1994 | Vettiger et al. | 369/121 |
| 5,446,719 | 8/1995 | Yoshida et al. | 369/44.12 |

FOREIGN PATENT DOCUMENTS 56-37834  4/1981  Japan .
59-96789  6/1984  Japan .
63-90037  4/1988  Japan .

*Primary Examiner*—Loha Ben
*Attorney, Agent, or Firm*—Frishauf, Holtz, Goodman, Langer & Chick

[57]  ABSTRACT

The present invention is directed to an apparatus using an integrated type pickup as an optical head for writing and reading optical information and capabling of writing data at high speeds. The apparatus includes a laser diode having an active layer at its intermediate position and having one area side held over a surface of a semiconductor substrate with an insulating layer interposed between the semiconductor substrate and the laser diode relative to the active layer. The laser diode has two areas with the active layer as a boundary and a constant potential is applied from a power supply to the insulating layer side of the laser diode and a transistor (laser diode drive unit) is provided to apply a modulation signal to the other area of the laser diode so that the laser diode is driven to modulate its output. By doing so, a constant potential is maintained at the semiconductor substrate and at the insulating layer's side of the laser diode and the modulation signal is applied to the other area side of the laser diode. When a drive current of the laser diode is varied by the modulation signal, a voltage variation occurs only on the other area side of the laser diode so that a high-frequency drive current, if flowing through the insulating layer side, is small and hence the laser diode has its output to be modulated effectively.

10 Claims, 4 Drawing Sheets

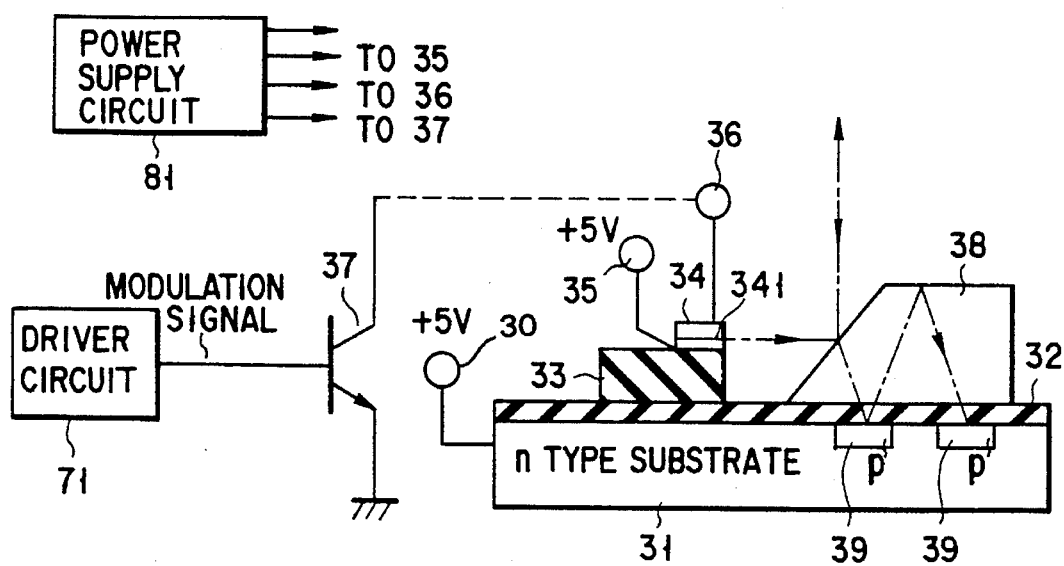
F I G. 6
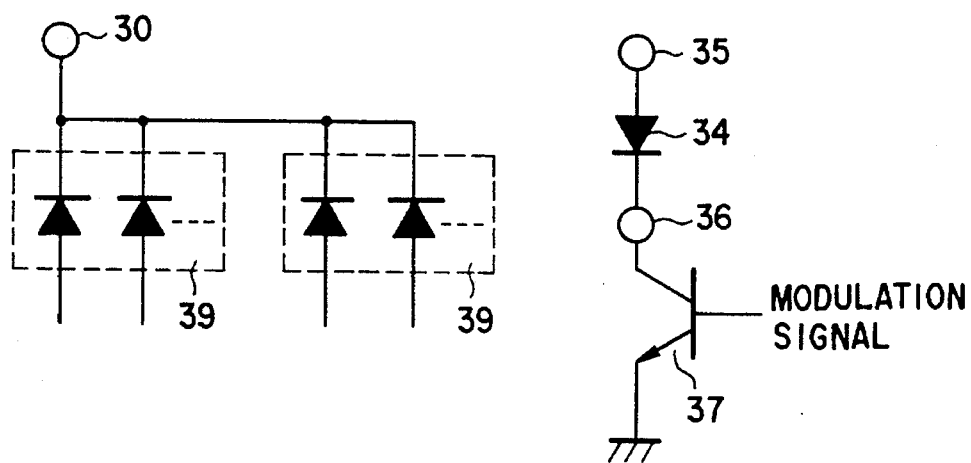
F I G. 7

APPARATUS USING AN OPTICAL PICKUP

BACKGROUND OF THE INVENTION

1. Field of the Invention

The present invention relates to a light information record/playback apparatus, including an optical head having a laser diode provided over a semiconductor substrate with an insulating layer interposed, which can effectively read and write data.

2. Description of the Related Art

A record/playback apparatus is known which can write or read optical information using an optical head. Stated in more detail, an optical type information record/playback apparatus is used which records/plays back information by directing a light spot at an information recording medium. With this type of information record/playback apparatus, a laser diode is employed as a light source of an optical head. A light beam emergent from the laser diode is modulated in accordance with record data. Recording is made by directing the modulated light beam as a light spot on the information recording medium and data playback is made by detecting a reflected light beam from the recording medium by a photodiode.

As the optical head for such an optical type information record/playback apparatus, the adoption of the following structure has been studied. That is, an integrated type optical pickup has been under consideration, including optical semiconductor elements, such as a laser diode and photodiode, provided at a semiconductor substrate. With the integrated type optical pickup (optical head), an optical semiconductor element is formed over the semiconductor substrate and a hard-to-fabricate part is assembled as a mount component part, thus achieving a low-cost compact apparatus.

In the integrated type optical pickup, however, various problems arise from an interference between a semiconductor laser diode (LD) and a photodiode (PD), hard-to-fabricate parts in the manufacture of the optical pickup, etc. For example, Jpn. Pat. Appln. KOKAI Publication No. 59-96789 discloses such problems as set out above. To be brief, when a laser diode and photodiode are formed at one semiconductor substrate, an insulating layer is provided between the semiconductor substrate and the laser diode. This specific structure can prevent an undesirable electrical connection from being made between the laser diode and the photodiode, that is, a problem produced at the time controlling the output of the laser diode. Further, it is possible to ensure the easiness with which the associated components parts are assembled.

In the case where the integrated type pickup is used for an optical magnetic disc, phase variation disc, etc., in particular, of the record/playback apparatus including a compact disc, it is sometimes required that, upon the writing of data, an output of the laser diode be high-speed modulated in accordance with the data. In order to reduce a noise component produced from the laser diode upon reading the data, the laser diode (LD) is sometimes driven with a high-frequency wave added. For the reduction of the noise component, the high-frequency wave to be superimposed is sometimes upon at a very high level of as much as several hundreds of MHz. The high-frequency wave superimposition technique is known in, for example, Jpn. Pat. Appln. KOKAI Publication No. 56-37834.

In the technique as disclosed in Publication 56-37834, if the superimposition of a high-frequency wave is effected, at all times, for noise reduction, the output of the laser diode exceeds its rated level at a high-output time, such as a record/erase time, thus posing an LD's lifetime problem. From this viewpoint, the laser diode is driven in a high-frequency mode at a playback time and stopped at a record/erase time. A switching circuit is provided between the semiconductor laser and a high-frequency wave superimposing circuit and controlled in accordance with a playback mode and record/erase mode. To be specific, a diode is connected across the laser diode and the high-frequency wave superimposing circuit and, by turning this diode ON or OFF, the laser diode is high-frequency driven in an ON/OFF fashion.

If, in this technique, an insulating layer is interposed between the semiconductor substrate and the laser diode, then a problem stays unsolved as will be set out below. That is, if the semiconductor substrate is so interposed, a capacitance is created between the semiconductor substrate and the laser diode due to the presence of the insulating layer and, upon the application of a modulation to the laser diode, provides a problem. Upon the direct application of the modulation signal to the laser diode in this case, a high-frequency current to be applied to the laser diode flows via the insulating layer into the semiconductor substrate due to an action of that capacitance between the laser diode and the semiconductor substrate. It is, therefore, not possible to achieve high-speed modulation because the high-frequency current does not flow into the laser diode side.

Explanation will now be given below briefly about the semiconductor laser diode structure. The semiconductor laser diode has a pn junction as well known in the art. That is, the laser diode is so formed as to have a plurality of p-type semiconductor layers in the surface portion of an n-type semiconductor substrate with an active layer of the laser diode provided as an intermediate layer. By flowing a forward current through the laser diode, a laser beam emerges from the active layer. The laser diode has a pair of opposed electrodes and, of these two electrodes, one is situated on the semiconductor substrate side and the other electrode on a side opposite to said one electrode relative to the active layer.

The laser diode is of such a structure that it is held over the semiconductor substrate of the integrated type optical pickup with the insulating layer interposed in which case any one electrode side is normally used. When a modulation signal is supplied to the laser diode, high-frequency current will be flowed via the insulating layer into the semiconductor substrate side, in spite of the need to be flowed into the laser diode, owing to an action of the capacitance between the laser diode and the semiconductor substrate of the integrated type optical pickup. As a result, almost no high-frequency current flows through the layer diode, thus failing to achieve high-speed modulation.

It is, therefore, not possible to write data at high speeds and hence to reliably read it because there is no adequate superimposition of the high frequency wave.

SUMMARY OF THE INVENTION

A first object of the present invention is to provide an apparatus using an integrated type optical pickup as a light information write/read optical head and a light information record/playback apparatus using an optical head having a laser diode provided over a semiconductor substrate with an insulating layer interposed, both of which can write data at high speeds.

A second object of the present invention is to provide both the apparatus, as set out above in connection with the first object, which can read data with improved reliability.

In order to achieve the object of the present invention, there is provided a light information record/playback apparatus, comprising:

an optical head including a laser diode having an active layer as an intermediate layer and having one area side held over a surface of a semiconductor substrate with an insulating layer interposed relative to an active layer;

a power supply circuit for supplying a constant potential to the semiconductor substrate and to the one area side of the laser diode situated on the insulating layer; and a laser diode drive device for applying a modulation signal to the other side of the laser diode.

By doing so, a constant potential is held on both the surface sides of the semiconductor substrate in the optical head and a modulation signal is applied to that area of the laser diode situated remote from the insulating layer. When the drive current of the laser diode is varied by the modulation signal, a voltage variation is produced only on a side situated opposite to the insulating layer-side of the laser diode relative to the active layer. This specific arrangement can substantially prevent high-frequency drive current from flowing toward the insulating layer side. It is, therefore, possible to effectively achieve the modulation of the laser diode's output.

According to the present invention, the laser diode is so provide that the same potential is held both at the area side of the laser diode situated relative to the active layer and at the semiconductor substrate side.

Since the same potential is applied to both the insulating layer side of the laser diode situated relative to the active layer and to the semiconductor substrate, there is no action of a capacitance between the laser diode and the semiconductor substrate which would otherwise be encountered in an AC current way. When the drive current of the laser diode is varied by applying a modulation signal to the opposite area side of the laser diode situated relative to the active layer, a voltage variation is produced only at that area side of the laser diode. A high-frequency drive current, if flowing through the insulating layer, is small. It is possible to effectively achieve the modulation of the laser diode and hence to write and read data with enhanced reliability.

According to the present invention, a high-frequency signal applying means for applying a high-frequency signal is provided on the side of the laser diode situated not on the insulating layer side.

Since the high-frequency signal is so applied, a high-frequency drive current, if flowing through the insulating layer, is small. Since the laser diode has its output modulated effectively by doing so, a high-speed data write/read operation can be performed by high reliability.

According to one aspect of the present invention, the laser diode is provided directly on the insulating layer.

This specific arrangement ensures a simplified optical pickup.

According to another aspect of the present invention, the laser diode is provided over the insulating layer with a conductive sub-mount interposed.

This specific arrangement ensures a better heat radiation from the laser diode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 6 is a diagrammatic arrangement showing another form of the integrated pickup; and FIG. 7 is a circuit arrangement showing a fourth embodiment of the present invention.

DETAILED DESCRIPTION OF THE PREFERRED EMBODIMENTS

An embodiment of the present invention will be explained below with reference to the accompanying drawings.

First Embodiment

Figure 1:
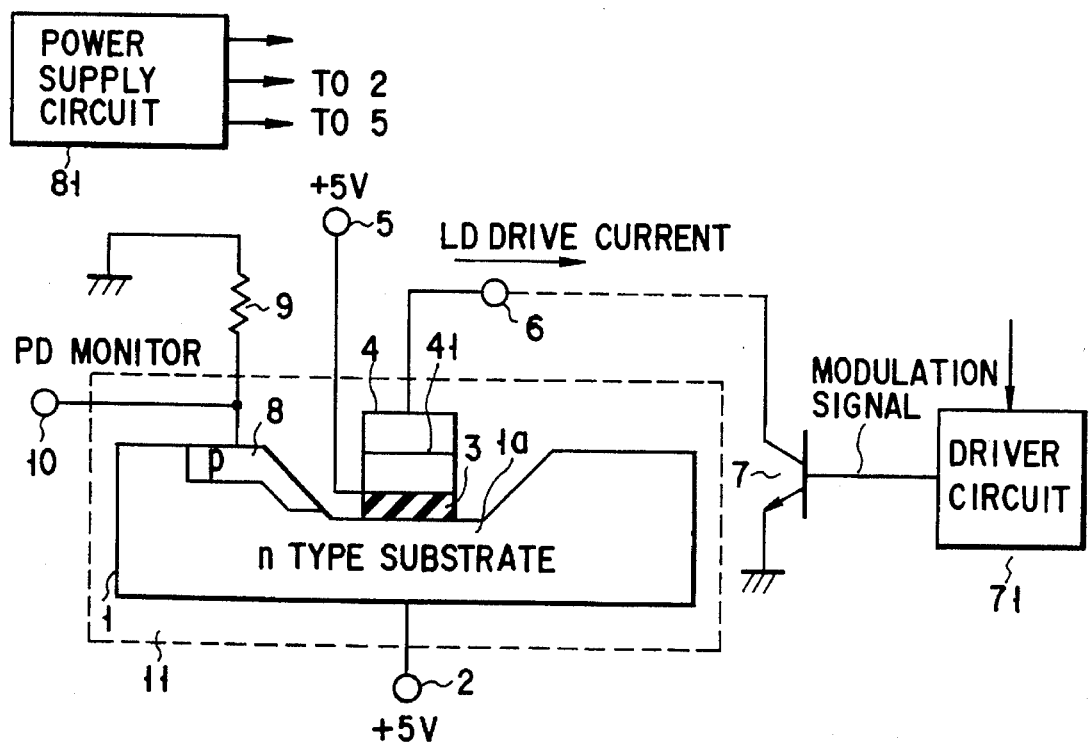
FIG. 1 is a diagrammatic view showing an apparatus according to a first embodiment of the present invention.

FIG. 1 shows an optical head of an optical information record/playback apparatus to which the present invention is applied. In FIG. 1, part of an integrated type pickup is illustrated which comprises a laser diode formed over a semiconductor substrate with an insulating layer interposed and a photodiode for directly monitoring a light beam emerging as an exit beam from the laser diode.

In the first embodiment, the output of the laser diode is modulated at high speeds in accordance with write data.

As shown in FIG. 1, an n-type semiconductor substrate 1 has a first surface on one side and a second surface on its rear side. A recess 1a is provided at a substantially center on the first surface of the semiconductor substrate 1 and has an inclined side wall. The second surface of the semiconductor substrate 1 is connected to a terminal 2.

An insulating layer 3 is provided on a bottom surface of the recess 1a of the semiconductor substrate 1. A laser diode 4 is formed on the insulating layer 3 and has a plurality of layers, that is, n- and p-type semiconductor layers. An active layer 41 is provided as an intermediate layer between the semiconductor layers and produces a laser beam. The laser diode 4 has a positive (+)-side electrode and a negative (−)-side electrode relative to the active layer 41 in which case one of these electrodes is connected to the terminal 5 and the other terminal to a terminal 6.

The laser diode 4 is provided relative to the bottom of the recess surface 1a of the semiconductor substrate 1 such that any one of its electrodes contacts with the insulating layer 3. According to the present invention, an npn transistor 7 is connected to that terminal (terminal 6) connected to the laser diode's electrode on a side not contacted with the insulating layer 3 so that a modulation signal is applied to the terminal 6 to allow the output of the laser diode 4 to be modulated. In the first embodiment, the laser diode 4 has its insulating layer (3)-connected side as the positive (mode) side. Therefore, the npn transistor 7 is connected at its collector side to the negative (cathode)-side of the laser diode 4 and at its emitter to ground and supplied at its base with a modulation signal. With the first embodiment, one important feature lies in that the modulation signal be applied to the terminal 6 side.

A p-type region is provided on that side surface portion of the recess 1a of the semiconductor substrate 1 which faces the laser diode 4. A photodiode 8 is defined together with the n-type semiconductor substrate 1. The photodiode 8 is used to monitor an exit beam from the laser diode 4. An electrical resistor 9 is connected to the photodiode 8 so that a beam current of the photodiode 8 is connected to a voltage and detects it. A photodiode monitor terminal (PD monitor terminal) is connected to a connection point between the resistor 9 and the photodiode 8 to monitor the light beam of the photodiode.

Figure 2:
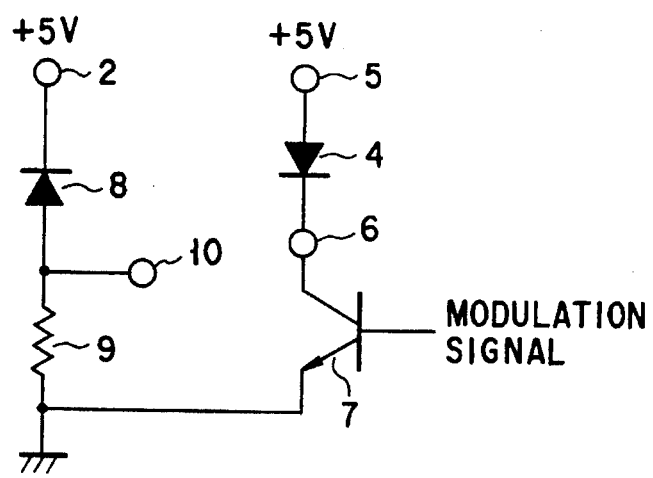
FIG. 2 shows one equivalent circuit of part of the embodiment of FIG. 1.

FIG. 2 shows an equivalent circuit of the integrated type pickup thus constructed. In FIG. 2, the photodiode 8, being composed of the n-type semiconductor substrate 1 and p-type region, is connected at its cathode side to the terminal 2 of the semiconductor substrate 2 and at its anode side to ground via the resistor 9 and to the monitor terminal 10.

The laser diode 4 has its anode-side semiconductor region mounted on the insulating layer 3 so that the laser diode 4 is held on the semiconductor substrate 1 with the anode-side semiconductor region connected to the terminal 5. The cathode-side semiconductor region of the laser diode 4 is situated on the side not contacted with the insulating layer 3 and the cathode-side semiconductor region is connected through the terminal 6 to the collector side of the npn transistor 7. A modulation signal is supplied to the base of the npn transistor 7 to allow the output of the laser diode 4 to be modulated, at high speeds, in accordance with write data. The modulation signal is supplied to a drive circuit 71.

A constant-level voltage, for example, +5 V, is fed from a power supply circuit 81 to the terminal 2 of the n-type semiconductor substrate 1 and to the terminal 5 connected to that region of the laser diode 4. This is one example and a simpler arrangement is adopted where a voltage +5 V is applied. In this connection it is to be noted that it is always necessary to use equal voltages so long as the conditions are met under which constant voltages are used as ones applied to the terminals 2 and 5. That is, if these respective constant voltages are employed, they undergo no MC variation even if being different in level and, in this case, electric current ceases to flow even if being flowed temporarily at an initial phase of time.

According to the present invention, this current suppression effect is advantageously utilized between the semiconductor substrate 1 and that semiconductor region of the laser diode 4 situated on a side contacted with the insulating layer 3. Taking into consideration the fact that the kinds of voltages of the DC power supply available in the apparatus are normally restricted, the voltages applied to the terminal 2 and the terminal 5 are set to the same level, that is, +5 V, according to the present embodiment. It is to be noted that these terminals 2 and 5 may be connected, in the integrated pickup 11, with their connection point connected from the power supply circuit 81 to a +5 V voltage supply line.

The operation of the first embodiment thus arranged will be explained below.

A +5 V DC voltage is applied to the terminal 2 connected to the n-type semiconductor substrate 1 in the optical pickup and to the terminal 5 of the electrode on the insulating layer 3-contacted side of the laser diode 4, that is, the terminal 5 connected to the anode-side semiconductor region. In this state, a modulation signal is supplied to the base of the npn transistor 7 to vary a drive current of the laser diode 4, at high speeds, in accordance with write data. When this occurs, a beam emergent from the laser diode 4 is translated into a beam modulated, at high speeds, in accordance with the modulation signal. The emergent beam is directed as a beam spot at a recording medium, not shown, through an optical system not shown, so that, through illumination with the beam, data recording is carried out.

Since the +5 V DC voltage is applied from the power supply circuit 81 to the terminal 2 of the n-type semiconductor substrate 1 and to the terminal 5 connected in a manner set out above, the same voltage (+5 V) is maintained normally at both the surface sides of the insulating layer 3. The npn transistor 7 is driven, at high speeds, upon receipt of a modulated drive signal from the driver circuit 71 to allow corresponding data to be written and, by doing so, a voltage variation occurs, even if the drive current is varied in the laser diode 4, only on the terminal 6 side region, that is, on the region side of the laser diode 4 situated remote from the insulating layer 3. A capacitance is equivalently provided by the n-type semiconductor substrate 1, insulating layer 3 and anode-side semiconductor region 4a, that is, laser diode 4-side region contacted with the insulating layer 3. The capacitance above fails to function as such in an AC-current fashion. Therefore, a high-frequency current applied to the laser diode 4 flows through the laser diode 4 without flowing through the insulating layer 3.

In the first embodiment thus arranged, both the surface sides of the insulating layer 3 underlying the laser diode 4 are made at the same potential. A high-frequency drive current, if flowing through the insulating layer 3 is small. This specific arrangement allows the high-frequency drive current to flow through the laser diode 4 effectively. It is, therefore, possible to effectively modulate the drive current in the laser diode 4 and to achieve a high-speed data write operation Further, the transistor is connected as the modulation element to the cathode side of the laser diode 4. The transistor is of a pnp-type and is more of advantage than a pnp-type transistor because it can achieve a high-speed operation, large current, low cost, etc., compared with the pnp transistor. Since the npn transistor provides an excellent modulation element over the pnp-type transistor, it is of very advantage to the application of, for example, an optical disc device involving a current variation resulting from a large current under high speed. Further, the laser diode is provided on the insulating layer, thus leading to a simple construction.

It is to be noted that the photodiode 8 is provided as a structure integral with the semiconductor substrate (n-type structure in the present embodiment) with the laser diode 4 mounted thereon. A separate photodiode may be mounted on the semiconductor substrate instead.

Second Embodiment

A second embodiment will be explained below with reference to FIG. 3.

The second embodiment is of such a structure that, in the integrated type pickup as set out in conjunction with FIG. 1, high-frequency wave superimposition is achieved at a time of reading data so as to reduce noise in an output of a laser diode which would be provided at the time of reading that data.

Figure 3:
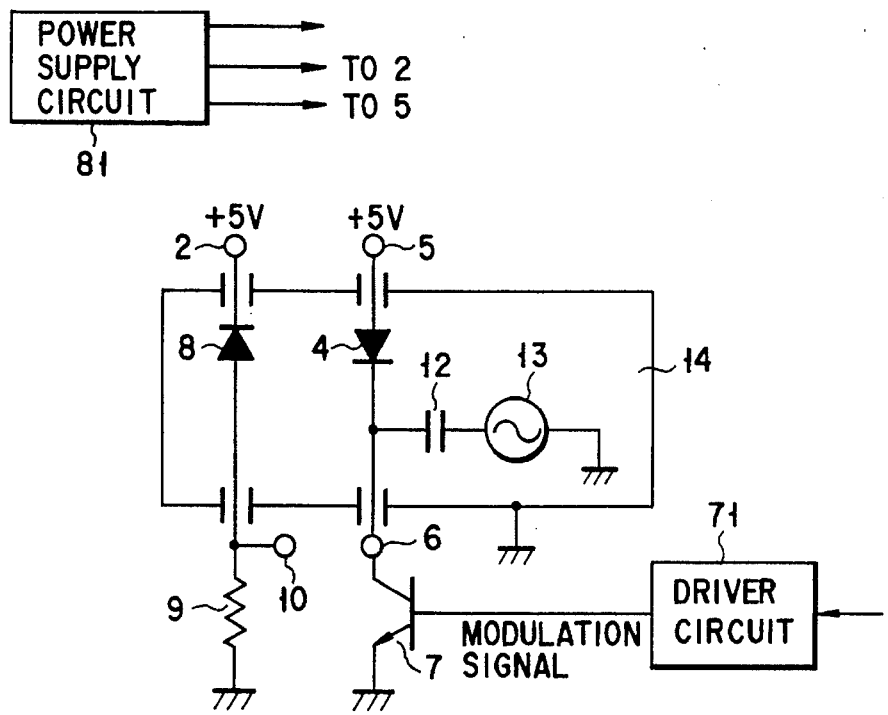
FIG. 3 shows a circuit arrangement according to a second embodiment of the present invention.

FIG. 3 is a circuit diagram showing circuit elements with the same reference numerals employed to designate those shown in FIG. 2. In FIG. 3, a high-frequency wave superimposition circuit is provided to the circuit shown in FIG. 2 and comprises a capacitor 12 and an oscillation source 13. The output of the high-frequency wave superimposition circuit is applied to the cathode side of a laser diode 4, that is, to that region side remote from an insulating layer 3. The high-frequency wave superimposition circuit constitutes, together with the laser diode 4 and photodiode 8, a high-frequency wave superimposition module 14. The module adopts a shield structure to prevent a high-frequency signal from leaking to an outside.

Here, the capacitor 12 is used to cut a DC component and the oscillation source 13 is provided to allow, to be delivered as an oscillation output, a high-frequency signal which is used to be superimposed on the output of the laser diode 4.

The high-frequency wave superimposition circuit, being comprised of the capacitor 12 and oscillation source 13, is connected to a terminal 6 side and, by doing so, is connected to the laser diode 4 region remote from the insulating layer 3, that is, to that region not contacted with the insulating layer 3. The high-frequency wave superimposition circuit, being used as the high-frequency wave superimposition module, suppresses the attenuation of a superimposing high-frequency signal to a minimal extent even if the superimposing high-frequency signal becomes as high as several hundreds of MHz. It is, also possible to prevent radiating high-frequency noise.

This arrangement enables a DC component of a current in the LD to be controlled by a transistor 7 at a playback time and a high-frequency component of the high-frequency wave superimposition circuit to be superimposed on the DC component. LD is driven by that superimposition signal of the DC signal and high-frequency signal. By this specific arrangement, it is possible to, while accurately controlling the LD's averaged output, achieve the superimposition of the high-frequency component very effectively.

Through the switching circuit as set out above, as a modulation component of a DC-eliminated LD current a high-frequency signal is applied from the high-frequency wave superimposition circuit to LD at a playback time and only a modulated signal of an information signal is applied to LD at a recording time. Since, at the high-output operation of LD such as a record or an erase operation, high-frequency wave superimposition is achieved. There is no possibility that, the LD output will exceed a rated level. It is possible to protect LD and ensure its long-duration life.

If, in the arrangement, a voltage +5 V is applied to the terminal 2 of the n-type semiconductor substrate 1 and to a terminal 5 side of LD 4, that is, to the LD's region contacted with the terminal 5, both the surface sides of the insulating layer 3 are maintained normally at the same voltage (+5 V). The high-frequency wave superimposition circuit, comprising the capacitor 12 and oscillation source 13, is connected to the LD's region side contacted with the insulating layer 3 and, even if the high-frequency signal is superimposed so as to reduce noise in the output of the laser diode 4, a voltage variation is produced on the terminal 6 side of the laser diode 4, that is, on that side not contacted with the insulating layer 3. In this arrangement, a high-frequency current, if flowing through the insulating layer 3, is small so that the superimposition of the high-frequency signal can be achieved effectively.

In order to superimpose the high-frequency signal at a data read time, a switching circuit, not shown, is connected to the high-frequency superimposition circuit. Such a switching circuit is disclosed in Jpn. Pat. Appln. KOKAI Publication No. 63-90037 in more detail and any further explanation is omitted for brevity's sake.

Even in the arrangement of the second embodiment, it is required, it is required that, at a write time, the drive current of the laser diode 4 be modulated in accordance with write data, but it is only necessary to connect an npn transistor for modulation to the terminal 6 of the laser diode 4, that is, to that side not contacted with the insulating layer 3, as in the case of the first embodiment.

A DC signal is applied to the npn transistor 7 at the data read time and a modulation signal is applied at the data write time. According to the second embodiment, therefore, both the surface sides of the insulating layer 3 are placed at the same potential so that electric current ceases to flow from the laser diode 4 through the insulating layer 3 to the n-type semiconductor substrate 1 in an AC current fashion. The high-frequency wave superimposition circuit is connected to that side of the laser diode 4 not contacted with the insulating layer 3 and the superimposition of the high-frequency signal is effected at the data read time. In this specific arrangement, the high-frequency current, if flowing from an oscillation source 13 through the insulating layer 3 into the n-type semiconductor substrate 1, is small so that it is possible to superimpose the high-frequency signal effectively relative to the laser diode 4. As a result, it is possible to effectively reduce the output noise of the laser diode 4 and to perform a data read operation in a stable way. At the data recording time, the high-frequency wave superimposing signal is stopped and the modulation signal is applied to the laser diode 4 so that it is possible to achieve the same state as in the first embodiment.

Third Embodiment

Figure 4:
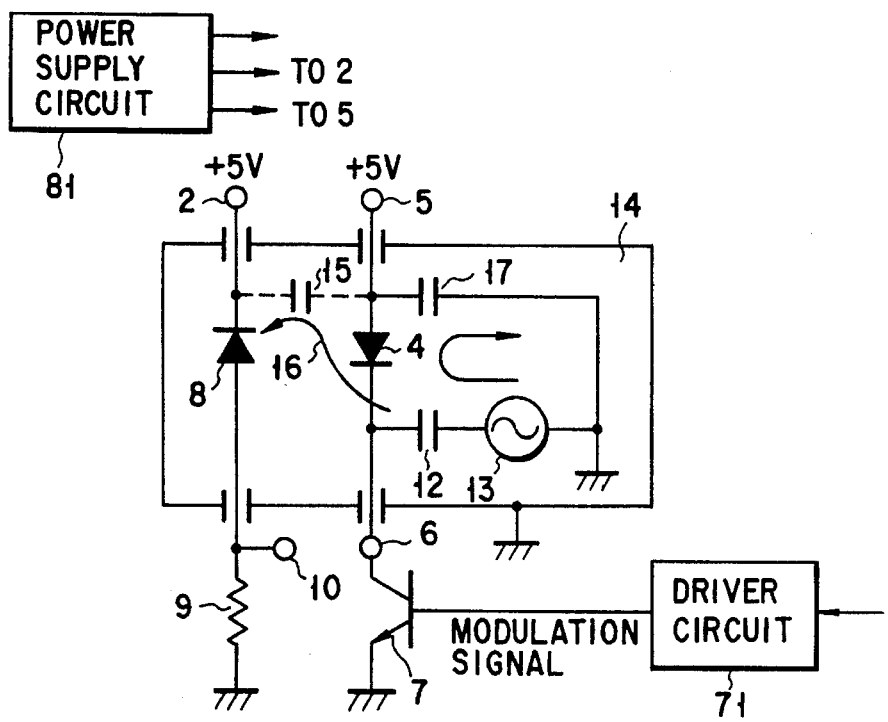
FIG. 4 shows a circuit arrangement according to a third embodiment of the present invention.

In the case where a high-frequency wave superimposition module 14 is so constructed as in the second embodiment, a parasitic capacitive component 15 comprising a laser diode 4, insulating layer 3 and photodiode 8 as an equivalent capacitance as shown in FIG. 4 is unavoidable. Depending upon the level of the parasitic capacitive component, there is a possibility that the high-frequency current will leak from an oscillation source 13 and flow as a leak current into the photodiode 8 side. Since the leak current 16 flows through the same path as an original light current of the photodiode 8, there is a risk that the light current of the photodiode 8 will not be detected.

In the third embodiment, therefore, an adverse effect can be alleviated which is caused by a leak current when the high-frequency wave superimposition mode is connected. According to the present invention, a specific arrangement is adopted to cancel the parasitic capacitive component 15 responsible for the cause of such leak current.

FIG. 4 is a circuit arrangement showing an arrangement of the third embodiment of the present invention. In FIG. 4, the same reference numerals are employed to designate parts or elements corresponding to those shown in FIG. 3. In order to cancel the capacitive component 15, a capacitor 17 greater in capacitance than the capacitive component 15 is connected between that side of the laser diode 4 contacted with the insulating layer 3 and a common line (a ground line side in the third embodiment). A capacitor 17 serving as a capacitive component is connected between the common line and an anode side, that is, the insulating layer-contacted side of the laser diode 4 in the high-frequency superimposition module 14.

The capacitor 17 may be so selected as to have a capacitance desirably adequately greater than that of the capacitive component 15 between the laser diode 4 and the photodiode 8. In order to completely cancel the capacitive component, it may be possible to select a capacitance greater by over one order of magnitude than that of the capacitive component 15. However, a capacitance lower than that just set out above may be employed if it is only necessary to alleviate the capacitance of the capacitive component 15. Further, even if that capacitance is equal to, or less than, that of the capacitive component, it is still possible to expect the effect with which leak current resulting from the parasitic capacitive component can be reduced.

In this case, the capacitor 17 of a greater capacitance 17 is connected to that side of the laser diode 4 contacted with the insulating layer 3 whereby the leak current 16 tending to flow toward the photodiode 8 side via the parasitic capacitive component 15 between the laser diode 4 and the photodiode 8 can be eliminated or reduced via the capacitor 17.

In this embodiment, it is necessary to modulate the drive current of the laser diode in accordance with write data, but the transistor 7 for modulation needs only to be connected to the terminal 6 side of the laser diode 4, that is, to that side not contacted with the insulating layer 3, in which case there is no risk that the modulation speed will be lowered by the addition of the capacitor 17.

With the third embodiment, the capacitor 17 of a capacitance greater than that of the parasitic capacitive component created between the laser diode 4 and the photodiode 8 is connected to that side of the laser diode 4 contacted with the insulating layer and, by doing so, the parasitic capacitive component 15 is canceled. As a result, a high-frequency current in the laser diode 4 ceases to flow, as a leak current 16, toward the photodiode 8 side and, even if high-frequency wave superimposition is carried out, it is possible to stably detect an amount of light through the photodiode 8.

Even in the first embodiment, the capacitor 17 may be connected, as required, in the same position as that in the third embodiment.

Although, in the first through the third embodiment, the semiconductor substrate 1 has been explained as being of the n-type, it may be replaced with a p-type semiconductor substrate. Even in this case, the npn transistor 7 for applying a modulation signal for modulating an output of the laser diode 4 may be connected to the side of the laser diode 4 not contacted with the insulating layer 3, that is, to that side remote from the semiconductor substrate 1 side, so that the transistor is controlled in accordance with write data to achieve the light emission control of the laser diode. Further, it is not necessary that the polarity and mount direction of the laser diode 4 be the same as those in the present embodiment.

Although, in the embodiment above, the transistor has been employed as an element for modulation-controlling the laser diode 4, other proper elements can be utilized if they are each comprised of a drive control element for achieving modulation control at high speeds. The drive control element may be connected to the side of the laser diode 4 not contacted with the insulating layer 3, that is, to that side remote from the semiconductor substrate 1 so that the drive control element is controlled in accordance with the write data to achieve light emission control.

The present invention can be applied not only to a structure comprised of a laser diode provided over the semiconductor substrate with the insulating layer interposed and a photodiode provided at the semiconductor substrate and monitoring an exit beam directly from the laser diode but also to an integrated type pickup comprised of a laser diode and a photodiode adapted to allow a laser beam which emerges from the laser diode to be received after it has been reflected on a recording medium.

Figure 5:
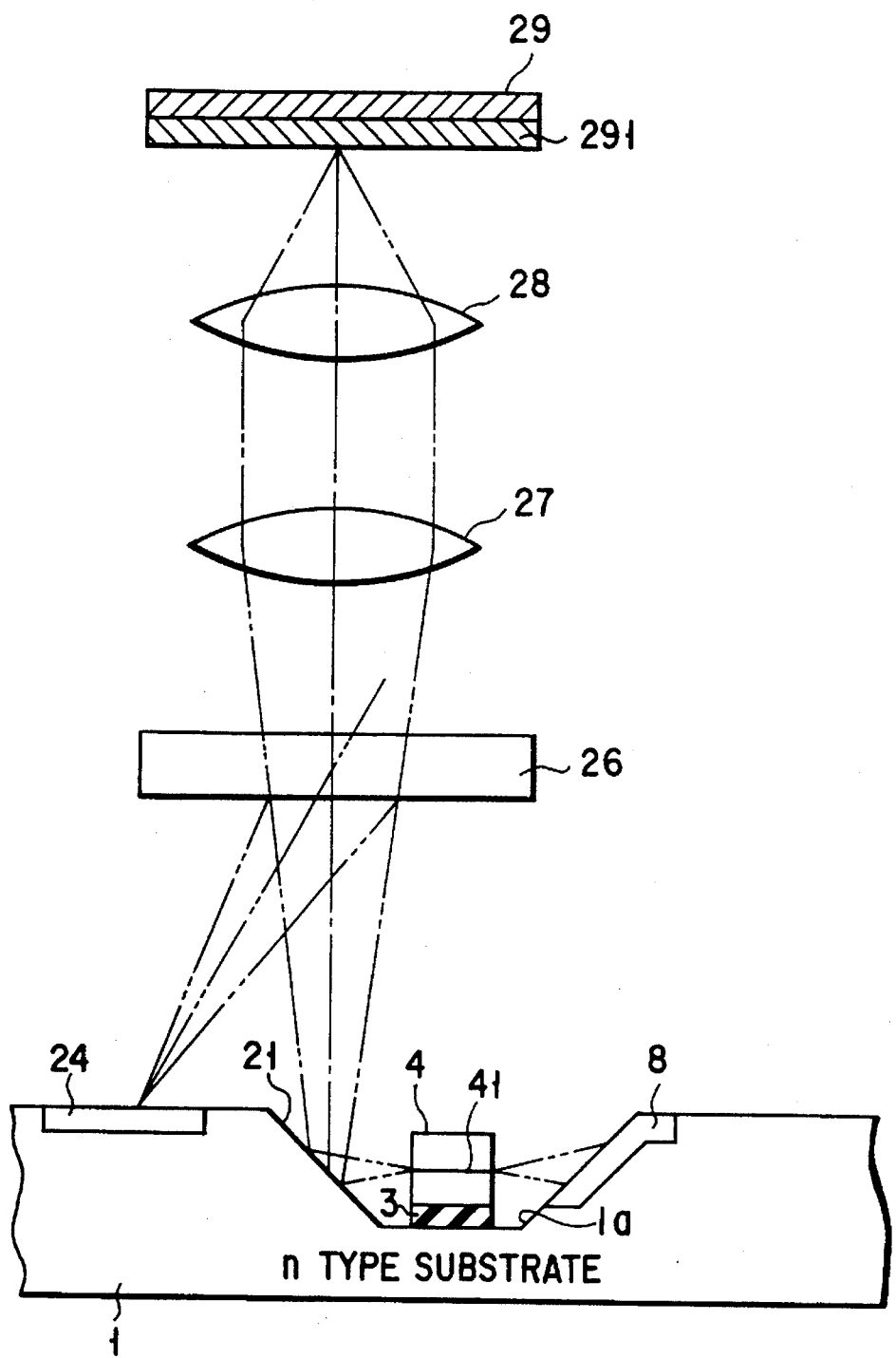
FIG. 5 is a diagrammatic arrangement showing a form of an integrated type pickup.

FIG. 5 is a schematic view showing such a type of integrated type pickup as set out above.

As shown in FIG. 5, a recess 1a is provided in one surface of a semiconductor substrate 1 and has an inclined side surface. An insulating layer 3 is provided on a bottom surface of the recess 1a of the semiconductor substrate 1 and a laser diode 4 is provided on the insulating layer 3. The laser diode is of such a type that, of its anode- and cathode-side regions, one region is provided in contact with the insulating layer 3 and the other region is provided distant from the insulating layer 3.

A photodiode 8 is provided in the surface portion of the semiconductor substrate 1 such that it is located near the laser diode 4. The photodiode 8 directly monitors a light beam emergent from the laser diode 4. A photodiode 24 is provided in the surface portion of the semiconductor substrate 1 such that it is located somewhat spaced away from the laser diode 4. The photodiode 24 detects a light beam reflected from a recording surface of a recording medium 29.

The photodiode 8 for laser output monitoring is provided on the inclined surface of the recess 1a at a location facing the laser beam emergent surface of the laser diode 4. Further, a reflection mirror 21 is provided, as a mirror surface, on that inclined surface of the recess 1a which faces the photodiode 8. The reflection mirror 21 allows the laser beam which emerges from the laser diode 4 along the surface of the semiconductor substrate 1 to be reflected in a direction vertical to the surface of the semiconductor substrate 1. The laser beam reflected from the reflection mirror 21 is incident on a beam splitter 26 utilizing a hologram.

The beam splitter 26 allows the vertically reflected beam which comes from the reflection mirror 21 to be transmitted and to be incident on a collimator lens 27 where the laser beam incident from the beam splitter 26 side is translated into a parallel beam. The parallel beam falls on the recording surface 291 of the recording medium 29 through an objective lens 28.

The reflected beam from the recording surface 291 of the recording medium 29 falls on the beam splitter 26 through the objective lens 28 and collimator lens 27. The beam splitter 26 allows the reflected beam which comes from the collimator lens 27 to be deflected through a given angle and to be so output. By deflecting the laser beam through that given angle, the reflected beam from the recording medium 29 falls on the photodiode 24, noting that the photodiode 24 receives an information signal, focus error signal and tracking error signal on the recording medium 29.

Through the application of the above-mentioned first through the third embodiment to the integrated type pickup, it is possible to obtain the same advantage as set out above.

Now a fourth embodiment of the present invention will be explained below.

Fourth Embodiment

In FIG. 6, a sub-mount 33 serving as a height adjusting base is provided on an insulating layer 32 overlying a semiconductor substrate 31. A laser diode 34 is arranged on the sub-mount 33, that is, over the insulating layer 32 of the semiconductor substrate 31 with the sub-mount 33 interposed. The sub-mount 33 is made of a conductive material.

A prism 38 is provided on the insulating layer 32 on the semiconductor substrate 31 in an opposed relation to the laser diode 34 on the sub-mount 33. A laser beam emergent from the laser diode 34 is reflected, by the prism 38, on a recording medium, not shown, and a reflected beam from the optical recording medium can travel toward the photodiodes 39. The photodiodes 39 are provided in the surface portion of the semiconductor substrate 31 at those positions corresponding to the prism 38 and the reflected beam coming from the optical recording medium is directed by the prism 38 to the photodiode 39. The insulating layer 32 is formed on the photodiode, but it is thin or transparent to allow the light beam to be transmitted. The integrated type pickup provides an integral unit including a light source relative to the recording medium and light receiving element for receiving the reflected light from the light recording medium and is utilized in the fourth embodiment.

In this embodiment, the semiconductor substrate 31 is of an n-type and the insulating layer 32 is formed on the semiconductor substrate 31 and the laser diode 34 is provided over the insulating layer 32 with the sub-mount 33 interposed. The sub-mount 33 is made up of, for example, an Si substrate and performs the double function of allowing heat radiation of the laser diode 34 and allowing ready positional adjustment of the light beam incident on the prism 38 from the laser diode 34. As the sub-mount 33, use may be made of a composition other than the Si substrate. In FIG. 6, reference numeral 341 shows an active layer of the laser diode 34.

The laser diode 34 has one region provided on the insulating layer 32 side relative to the active layer 341 and the insulating layer 32 side is connected to a terminal 35. The region of the laser diode 34 opposite to the insulating layer 32 side is connected to a terminal 36. npn Transistor 37 is connected to the terminal 36 to enable a supply of a modulation signal for laser diode's output adjustment.

In the embodiment above, the laser diode 34 has its anode connected to the terminal 35 and its cathode connected to the terminal 36. For this reason, the npn transistor 37 is connected at its collector to the terminal 36 and has a grounded emitter.

Below the lower surface of the prism 38 provided on the insulating layer 32 on the semiconductor substrate 31 in an opposed relation to the laser diode, p-type regions are formed with the insulating layer 32 interposed and, together with the n-type semiconductor substrate 31, provide photodiodes 39, 39. These photodiodes 39, 39 detect the reflected beam from the optical recording medium, not shown, and are used to obtain a played-back signal, servo signal signal, etc. This is the reason why the photodiodes constitute a plurality of divided light receiving surfaces.

A respective constant voltage direct current is applied to a terminal 30 of the n-type semiconductor substrate 31 and to the terminal 35 connected to that side of the laser diode 34 situated more toward the insulating layer 32 than the active layer 341. The constant voltage is a DC voltage of, for example, +5 V and supplied from a current supply circuit 81. The voltages supplied from the power supply circuit 81 to the terminals 30, 35 are not necessarily made at the same level so long as they are made at constant levels. Since, however, a restricted power supply voltage is normally employed in the apparatus, a voltage of +5 V is applied both to the terminals 30, 35 in the above embodiment. These terminals 30, 35 may be so arranged in the integrated type pickup as to be connected to a connection point of +5 V so that a constant voltage may be supplied.

A modulation signal is fed from a driver circuit 71 to the base of the npn transistor 37 to modulate an output of the laser diode 34 at high speeds in accordance with write data.

FIG. 7 is a circuit arrangement showing the above-mentioned integrated-type pickup. In the embodiment shown, the laser diode 34 is connected at its anode to the terminal 35 and at its cathode connected to the npn transistor 37 through the terminal 36. The photodiodes 39, 39 have their cathodes commonly connected to the terminal 30 and those amounts of light received by the respective photodiodes 39, 39 are detected from the corresponding light currents from their anodes.

The operation of the fourth embodiment thus arranged will be explained below.

Even in this embodiment, a modulation signal corresponding to write data is supplied via the driver circuit 71 to the base of the npn transistor 37 to enable a drive current of the laser diode 34 to vary at high speeds in accordance with write data. Then, a light beam emergent from the laser diode 34 is high-speed modulated in accordance with the modulation signal directed as a light spot at a recording medium, not shown, through an optical system, not shown, so that data recording is carried out.

In the apparatus set out above, both the surface sides of the insulating layer 32, that is, the semiconductor substrate 31 and sub-mount 33, are maintained normally at the same voltage level (+5 V). Even if the drive current of the laser diode 34 is varied at high speeds, a voltage variation is produced only on the electrode 36 side opposite to the insulating layer 32 side as viewed from the active layer 341 so that a high-frequency current, if flowing through the insulating layer 32, is small.

Even in the fourth embodiment, making the flow of the high-frequency current through the insulating layer 32 small is achieved by making both the surface sides of the insulating layer at the same potential level. By doing so it is possible to modulate the drive current of the laser diode 34 at high speeds and hence the achieve a data write operation at high speeds.

The npn-type transistor can be used, as an element for the modulation drive of the laser diode 34, in view of its high-speed operation, its large current, its low cost, etc., compared with the pnp-type transistor. The sub-mount 33, being provided as set out above, can be used to radiate heat evolved in the laser diode 34. It is of benefit to use the present invention for an optical disc device for phase variation recording necessary for a current variation resulting from high-speed large current in particular. The use of the sub-mount 33 as set out above ensures the ready registry of optical component parts such as the laser diode 34 and prism 38.

With the integrated type pickup as set out in connection with the fourth embodiment, a high-frequency wave superimposition system as set out above can be applied so as to reduce noise in the output of the laser diode, a problem which arises at a data read time. In the realization of the high-frequency wave superimposition, there is sometimes the case where light current cannot accurately be detected by the photodiodes 39, 39 due to the leakage of the high-frequency current resulting from a parasitic capacitive component between the laser diode 34 and photodiodes 39, 39 including the insulating layer 32 and the flow of the high-frequency current through these diodes. As a countermeasure, it is possible to employ the technique for providing a capacitor as set out above in connection with the third embodiment. That is, it is only necessary to employ the technique for providing a parasitic capacitance cancellation capacitor for alleviating an adverse influence resulting from leak current at the high-frequency wave superimposition operation as set out in connection with the third embodiment. Although, in the second through the fourth embodiment, the npn-type transistor 7 has been explained as being used as a drive element for modulation drive of the laser diode with a modulation signal, this can also be achieved by the pnp-type transistor. It is possible to use other elements, such as kinds of field effect transistors, for controlling electric current with a high-frequency signal.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An apparatus comprising:

an optical head having at least a semiconductor substrate, an insulating layer and a laser diode and adapted to perform at least one of an information recording operation and playback operation, the insulating layer being provided on a surface of the semiconductor substrate, and the laser diode having an active layer and respective semiconductor area sides on opposite sides of the active layer, the active layer being arranged at an intermediate position between the area sides, and one of the area sides being mounted over the semiconductor substrate with the insulating layer interposed between the one area side and the semiconductor substrate;

potential applying means for applying a constant potential to the one area side of the laser diode; and modulation signal applying means for applying a modulation signal to another area side of the laser diode.

2. The apparatus according to claim 1, wherein the potential applying means applies the same potential to the semiconductor substrate and to the one area side of the laser diode.

3. The apparatus according to claim 1, wherein the modulation signal applying means comprises a high-frequency applying device for applying a high-frequency signal to said another area side of the laser diode.

4. The apparatus according to claim 1, wherein the laser diode is provided directly on the insulating layer.

5. The apparatus according to claim 1, wherein:

the insulating layer has a surface on which a conductive sub-mount is provided; and the one area side of the laser diode is supported on the sub-mount with the sub-mount interposed between the laser diode and the insulating layer.

6. The apparatus according to claim 1, wherein the laser diode is of such a type that a capacitive element is connected between a common potential side and the one area side of the laser diode.

7. The apparatus according to claim 1, wherein a device is provided which, at a playback time, applies a DC signal to said another area side of the laser diode.

8. The apparatus according to claim 1, wherein a high-frequency applying device is provided which, at a playback time, a superimposition signal of a DC signal and high-frequency signal is applied as a modulation signal of the laser diode.

9. The apparatus according to claim 1, wherein a high-frequency applying device is provided which applies, as a modulation signal of the laser diode, a high-frequency signal at a playback time and a modulated replica of an information signal at a recording time.

10. An apparatus according to claim 1, wherein said modulation signal applying means applies a DC signal to said another area of the laser diode at a playback time.

* * * * *